(12) United States Patent
Wang

(10) Patent No.: US 10,620,515 B2
(45) Date of Patent: Apr. 14, 2020

(54) PROJECTOR HOUSING AND PROJECTOR

(71) Applicant: ZTE CORPORATION, Shenzhen, Guangdong Province (CN)

(72) Inventor: Kai Wang, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 16/303,145

(22) PCT Filed: Aug. 5, 2016

(86) PCT No.: PCT/CN2016/093612
§ 371 (c)(1),
(2) Date: Nov. 20, 2018

(87) PCT Pub. No.: WO2017/210990
PCT Pub. Date: Dec. 14, 2017

(65) Prior Publication Data
US 2019/0302586 A1    Oct. 3, 2019

(30) Foreign Application Priority Data
Jun. 7, 2016    (CN) .................... 2015 2 0546821 U

(51) Int. Cl.
*G03B 21/16*    (2006.01)
*G03B 21/14*    (2006.01)
*G03B 21/00*    (2006.01)

(52) U.S. Cl.
CPC ........... *G03B 21/16* (2013.01); *G03B 21/145* (2013.01); *G03B 21/008* (2013.01)

(58) Field of Classification Search
CPC ...... G03B 21/006; G03B 21/16; G03B 21/28; G03B 21/145
See application file for complete search history.

(56) References Cited

U.S. PATENT DOCUMENTS

| | | | |
|---|---|---|---|
| 8,092,027 B2 | 1/2012 | Chuang | |
| 2006/0170885 A1* | 8/2006 | Kitahara | F16M 11/16 353/119 |
| 2009/0002642 A1 | 1/2009 | Chang | |
| 2009/0153807 A1* | 6/2009 | Jackson | G03B 21/64 353/95 |

(Continued)

FOREIGN PATENT DOCUMENTS

| | | |
|---|---|---|
| CN | 103207505 A | 7/2013 |
| CN | 103760740 A | 4/2014 |

(Continued)

OTHER PUBLICATIONS

Extended European Search Report for Application 16904439.3, PCT/CN2016093612 dated Mar. 13, 2019, 8 pgs., European Patent Office, Germany.

*Primary Examiner* — Sultan Chowdhury
(74) *Attorney, Agent, or Firm* — McDonald Hopkins LLC

(57) ABSTRACT

A projector housing and a projector are provided. The projector housing includes a housing body (10) and a support (20). The support (20) is arranged on the housing body (10) in an openable or closable manner. A first heat dissipation hole (11) is provided on the housing body (10) and at an inner side of the support (20). When closed on the housing body (10), the support (20) shields the first heat dissipation hole (11).

15 Claims, 4 Drawing Sheets

(56) References Cited

U.S. PATENT DOCUMENTS

| | | | | |
|---|---|---|---|---|
| 2010/0002198 A1* | 1/2010 | Chuang | ............... | G03B 21/16 |
| | | | | 353/52 |
| 2013/0114050 A1* | 5/2013 | Yamada | ............... | G03B 21/145 |
| | | | | 353/85 |
| 2013/0114052 A1* | 5/2013 | Fujioka | ............... | G03B 21/28 |
| | | | | 353/98 |

FOREIGN PATENT DOCUMENTS

| | | |
|---|---|---|
| CN | 204945612 U | 1/2016 |
| EP | 1536277 | 6/2005 |
| JP | 2000241885 | 9/2000 |
| JP | 2007010709 | 1/2007 |
| JP | 2008111898 | 5/2008 |

* cited by examiner

PROJECTOR HOUSING AND PROJECTOR

CROSS-REFERENCE

The present application is a U.S. National Phase Entry of International PCT Application No. PCT/CN2016/093612 having an international filing date of Aug. 5, 2016, which claims priority to Chinese Patent Application No. 201620546821.X filed on Jun. 7, 2016. The present application claims priority and the benefit of the above-identified applications, and the above-identified applications are incorporated by reference herein in their entirety.

TECHNICAL FIELD

The present application relates, but not limited to, the field of projection devices, and more particularly to a projector housing and a projector.

BACKGROUND

At present, in a micro projector product, due to the large power consumption of an optical machine, especially a laser light source, it is easy to cause the problem that generated heat of the whole machine is too large. In particular, the heat generation of a motherboard projection chip of the optical machine is more serious. If the temperature of a component such as the motherboard projection chip is too high, the user experience may be reduced or even the component may be burnt out. Therefore, most of these products need to add a fan for system heat dissipation. A fan heat dissipation system generally needs to provide a large number of holes on a primary appearance surface to form an air passage to realize air circulation. However, a large number of holes not only affect the attractiveness of a product, but also easily make ash or even small objects enter the product, thereby causing damage to the product.

In addition, most of projector products on the current market are provided with one support or one spiral column in the middle of the front end of a projector housing to adjust the angle of the projector. However due to limitations of a use environment, such as desktop unevenness or product assembly tolerance, projection picture skew will be caused, and angle adjustment with one support or one spiral column cannot correct the horizontal skew of a projection picture due to assembly and placement positions. In addition, related projectors can only perform simple T-shaped corrections with a built-in program, and horizontal correction cannot be implemented. Supports or spiral columns of most of projector products cannot successively adjust an elevation angle.

Regarding the problem in the known art of influence on the appearance of a product due to a large number of holes on a projector for achieving heat dissipation, an effective solution has not been proposed yet.

SUMMARY

The following is a brief introduction for a subject described herein in detail. The brief introduction is not intended to restrict the scope of protection of claims.

A main objective of the present disclosure is to provide a projector housing and a projector, to solve the problem in the known art of influence on the attractiveness of a product due to a large number of holes on a projector for achieving heat dissipation.

A projector housing includes a housing body and a support. The support is arranged on the housing body in an openable or closable manner. The housing body is provided with a first heat dissipation hole which is arranged at an inner side of the support. When closed on the housing body, the support shields the first heat dissipation hole.

In an exemplary embodiment, the first heat dissipation hole is arranged on a bottom wall of the housing body, and the support includes a support cover plate for shielding the first heat dissipation hole.

In an exemplary embodiment, a second heat dissipation hole is provided on a side wall of the housing body.

In an exemplary embodiment, the support further includes: a side frame.

The side frame is connected to the support cover plate, the side frame is provided with a second dustproof net, and when the support is at a closed position, the second dustproof net shields one side of the second heat dissipation hole.

In an exemplary embodiment, two opposite side walls of the housing body are provided with the second heat dissipation hole respectively.

In an exemplary embodiment, a lug portion is arranged on the side frame, and the support is hinged to the housing body through the lug portion.

In an exemplary embodiment, there are two supports, and inner sides of the two supports are provided with the first heat dissipation hole respectively.

In an exemplary embodiment, a first dustproof net is arranged on an end surface of the first heat dissipation hole.

In an exemplary embodiment, the projector housing further includes: a sliding cover plate.

The sliding cover plate is slidably arranged on the housing body, and the sliding cover plate shields a first position of the first heat dissipation hole and avoids a second position of the first heat dissipation hole.

In an exemplary embodiment, the support is in a transmission connection with the sliding cover plate, drives the sliding cover plate to be at the first position when the support is closed on the housing body, and drives the sliding cover plate to be at the second position when the support is opened from the housing body.

In an exemplary embodiment, the first heat dissipation hole is a strip-shaped hole, and the support and the sliding cover plate respectively shield a partial hole section of the first heat dissipation hole.

In an exemplary embodiment, the support is in the transmission connection with the sliding cover plate through a transmission component, and the transmission component includes: a fixed block and a transmission shaft.

The fixed block is arranged on the sliding cover plate. The transmission shaft is in a threaded connection with the fixed block. The support is in a drive connection with the transmission shaft, and the support drives the transmission shaft to rotate.

In an exemplary embodiment, the support is provided with a driving gear, and the transmission shaft is provided with a driven gear that meshes with the driving gear.

In an exemplary embodiment, a heat dissipation air passage is arranged in the housing body, the first heat dissipation hole and the second heat dissipation hole are provided at two opposite ends of the housing body, an air inlet of the heat dissipation air passage is communicated with each first heat dissipation hole and the second heat dissipation hole at one end of the housing body, and an air outlet of the heat dissipation air passage is communicated with the second heat dissipation hole at the other end of the housing body.

A projector includes a housing, and an optical machine and a fan arranged inside the housing, and the housing is the projector housing of the above content.

In an exemplary embodiment, two opposite ends of the housing body of the projector housing are provided with the first heat dissipation hole respectively, a Digital Micromirror Device (DMD) chip of the optical machine is arranged at an inner side of the first heat dissipation hole at one end of the housing body, and the fan is arranged at an inner side of the first heat dissipation hole at the other end of the housing body.

In an exemplary embodiment, two opposite side walls of the housing body are provided with a second heat dissipation hole. The projector further includes: a first heat dissipation block and a second heat dissipation block.

The first heat dissipation block is in contact with a light source of the optical machine, and the second heat dissipation block is arranged at the second heat dissipation hole on one side wall of the housing body. Herein the second heat dissipation block and the first heat dissipation block are connected through a heat dissipation tube.

In an exemplary embodiment, the projector further includes: a motherboard chip which is connected to the second heat dissipation block through the heat dissipation tube.

According to the projector housing of the technical solution of an embodiment of the present disclosure, the support that is openable and closeable is arranged on the housing body, the first heat dissipation hole is provided at the inner side of the support, and when the support is closed on the housing body, the first heat dissipation hole is shielded, so that the heat dissipation requirement of a projector can be met, and the heat dissipation hole can be shielded when the projector is not used. Therefore, the attractiveness of the projector housing is improved, and the problem in the known art of influence on the attractiveness of a product due to a large number of holes on a projector for achieving heat dissipation is solved.

DETAILED DESCRIPTION

It should be noted that the embodiments in the present application and the features in the embodiments may be combined with each other without conflict. Embodiments of the present disclosure will be illustrated hereinafter with reference to the accompanying drawings and in conjunction with the embodiments.

Figure 1:
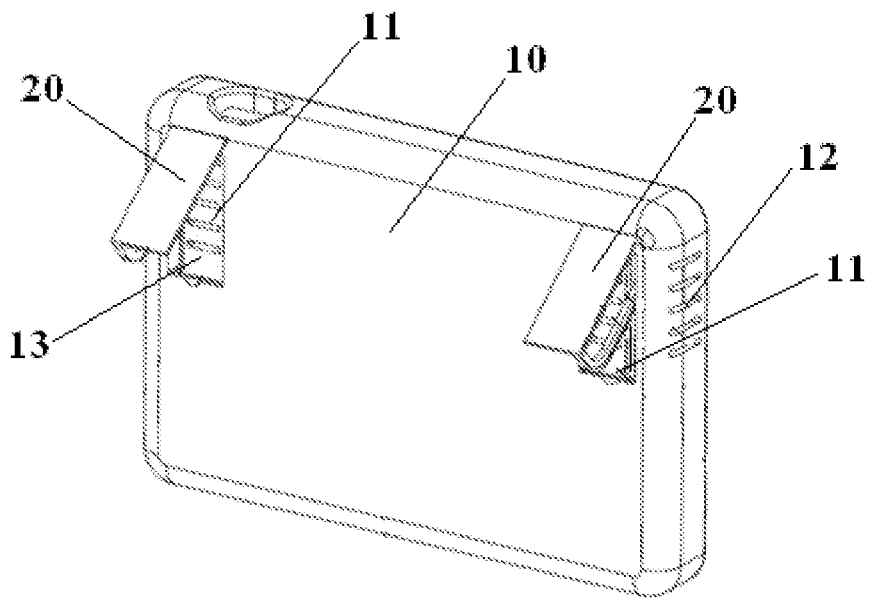
FIG. 1 is a schematic diagram of an alternative structure of a projector housing according to an embodiment of the present disclosure.

An embodiment of the present disclosure provides a projector housing. As shown in FIG. 1, the projector housing includes a housing body 10 and a support 20. The support 20 is arranged on the housing body 10 in an openable or closable manner. A first heat dissipation hole 11 is provided on the housing body 10, and the first heat dissipation hole 11 is arranged at an inner side of the support 20. When the support 20 is closed on the housing body 10, the first heat dissipation hole 11 is shielded.

According to the projector housing of the technical solution of an embodiment of the present disclosure, the support 20 that is openable and closeable is arranged on the housing body 10, the first heat dissipation hole 11 is provided at the inner side of the support 20, and when the support 20 is closed on the housing body 10, the first heat dissipation hole 11 is shielded, so that the heat dissipation requirement of a projector can be met, and the heat dissipation hole can be shielded when the projector is not used. Therefore, the attractiveness of the projector housing is improved, and the problem in the known art of influence on the attractiveness of a product due to a large number of holes on a projector for achieving heat dissipation is solved.

In an exemplary embodiment, the first heat dissipation hole 11 is arranged on a bottom wall of the housing body 10. There are two first heat dissipation holes 11. The two first heat dissipation holes 11 are located at corners of the bottom wall of the housing body 10. In an exemplary embodiment, there are also two supports 20. The two first heat dissipation holes 11 are correspondingly provided at inner sides of the two supports 20. To prevent dust from entering the housing body 10 from the first heat dissipation holes 11, as shown in FIG. 1 and FIG. 2, a first dustproof net 13 is further arranged on an end surface of each first heat dissipation hole 11.

Figure 2:
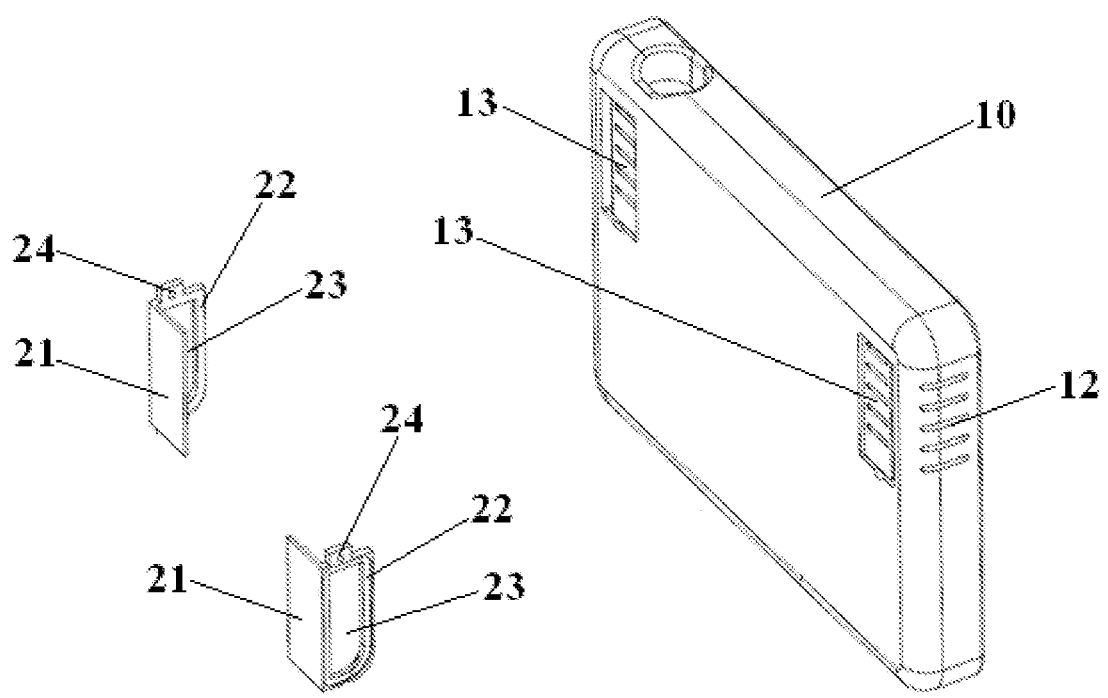
FIG. 2 is a schematic diagram of an alternative breakdown structure of a projector housing and a support according to an embodiment of the present disclosure.
Figure 3:
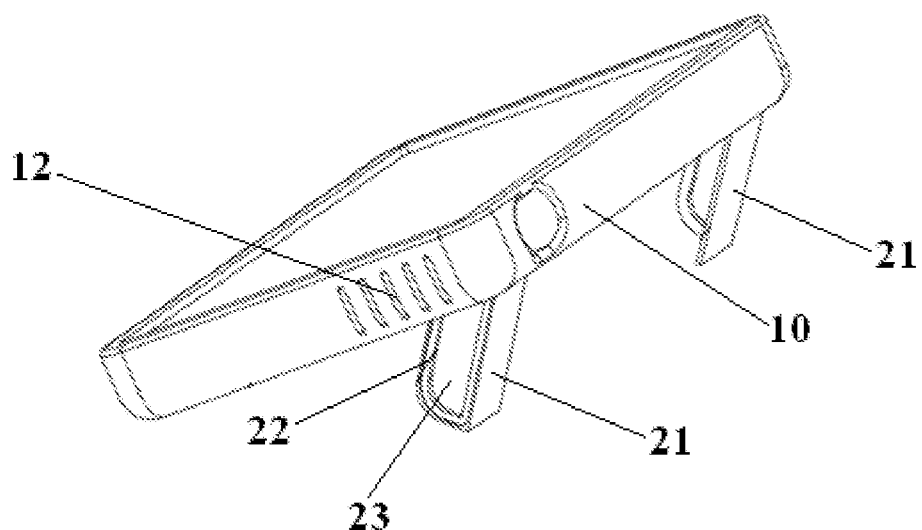
FIG. 3 is a schematic diagram of an alternative structure of a projector housing in a supporting state according to an embodiment of the present disclosure.
Figure 4:
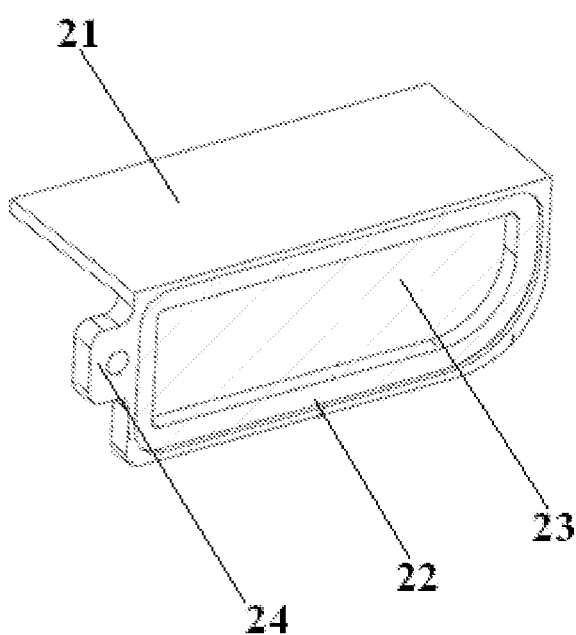
FIG. 4 is a schematic diagram of an alternative structure of a support of a projector housing according to an embodiment of the present disclosure.

As shown in FIG. 2 to FIG. 4, the support 20 includes a support cover plate 21 for shielding the first heat dissipation hole 11 and a side frame 22 vertically connected to the support cover plate 21. The structural strength of the support 20 can be improved by providing the side frame 22, thereby preventing the support cover plate 21 from being broken and damaged.

As shown in FIG. 4, a lug portion 24 is arranged on the side frame 22, the lug portion 24 is provided with a hinging hole, and the support 20 is hinged to the housing body 10 through the lug portion 24, so that the support 20 is opened and closed on the housing body 10.

As shown in FIG. 1 to FIG. 3, to improve the heat dissipation performance, a second heat dissipation hole 12 is further provided on a side wall of the housing body 10. There are two second heat dissipation holes 12, and the two second heat dissipation holes 12 are respectively provided on two opposite side walls of the housing body 10.

A second dustproof net 23 is arranged on the side frame 22 of the support 20, and the second dustproof net 23 enters the housing body 10 or exits from the housing body 10 with the opening and closing of the support 20. When the support 20 is at a closed position, the second dustproof net 23 enters the housing body 10 and shields one side of the second heat dissipation hole 12, thereby preventing dust from entering the housing body 10 through the second heat dissipation hole 12.

As shown in FIG. 4, the side frame 22 has a certain thickness, so that the second dustproof net 23 is embedded in a small hole enclosed by the side frame 22, and the second dustproof net 23 is prevented from being scraped off by the side wall of the first heat dissipation hole 11 when the support 20 is opened or closed.

Figure 5:
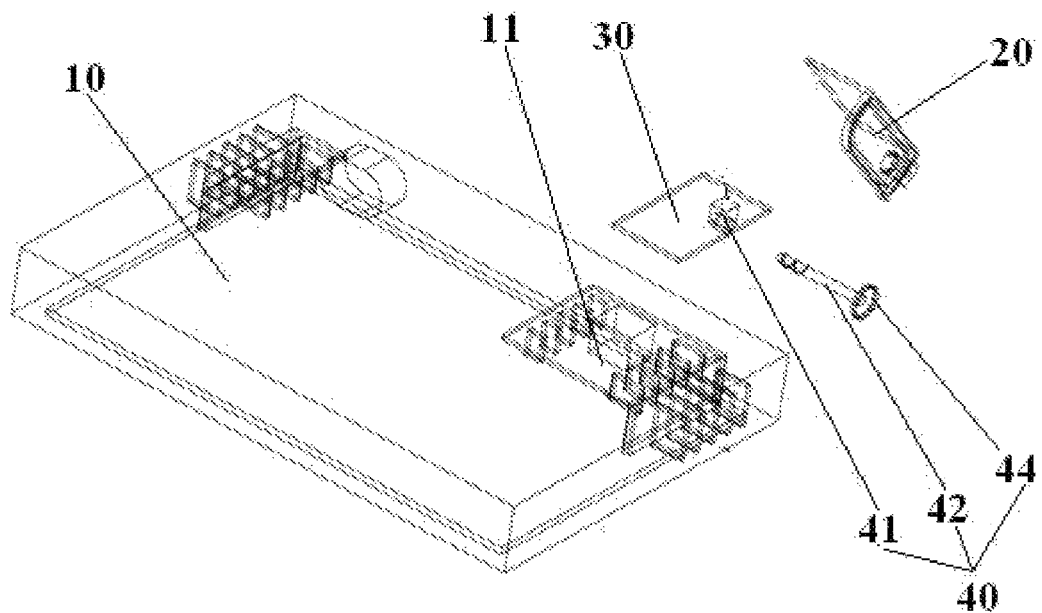
FIG. 5 is a structural schematic diagram of an alternative structure of another projector housing according to an embodiment of the present disclosure.

To maximize the area of the first heat dissipation hole 11 to enhance the heat dissipation effect, and reduce the influence on the attractiveness of the housing body 10, as shown in FIG. 5, a sliding cover plate 30 is slidably arranged on the first heat dissipation hole 11 of the housing body 10. In an exemplary embodiment, two opposite sliding grooves are provided at the first heat dissipation hole 11, two opposite sides of the sliding cover plate 30 are embedded into the sliding grooves and may slide along a direction towards or away from the support 20. The sliding cover plate 30 may shield a first position of at least part of the first heat dissipation hole 11 and avoid a second position of at least part of the first heat dissipation hole 11, such that at least part of the first heat dissipation hole 11 may be opened or closed, and the remaining portion of the first heat dissipation hole 11 is opened or closed by the support cover plate 21 of the support 20. In an exemplary embodiment, the first heat dissipation hole 11 is a strip-shaped hole, and the sliding cover plate 30 and the support cover plate 21 of the support 20 respectively open or close a part of the first heat dissipation hole 11 to cooperate with each other to open or close the first heat dissipation hole 11 with a larger area. Therefore, the heat dissipation effect can be improved, and the influence on the attractiveness of the housing body 10 can be reduced.

The support 20 is in a transmission connection with the sliding cover plate 30, and the sliding cover plate 30 is driven by the support 20. The support 20 drives the sliding cover plate 30 to be at the first position when closed on the housing body 10, that is, the first heat dissipation hole 11 is closed. The support 20 drives the sliding cover plate 30 to be at the second position when opened from the housing body 10, that is, the first heat dissipation hole 11 is opened.

Figure 6:
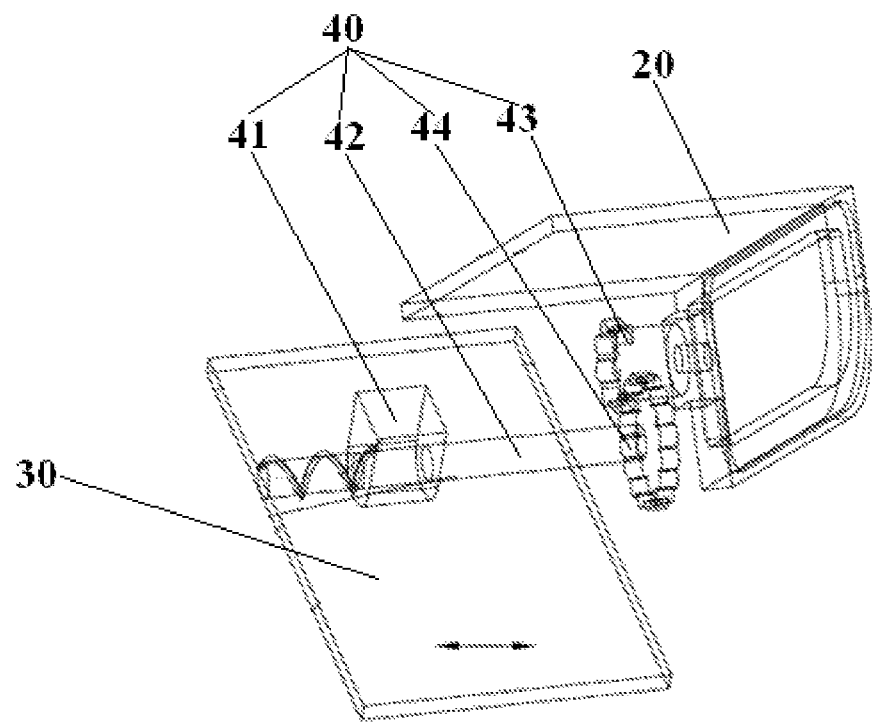
FIG. 6 is a schematic diagram of an alternative driving structure of a support and a sliding cover plate of another projector housing according to an embodiment of the present disclosure.

In an exemplary embodiment, the support 20 is in the transmission connection with the sliding cover plate 30 through a transmission component 40. As shown in FIG. 6, the transmission component 40 includes: a fixed block 41, a transmission shaft 42, a driving gear 43 and a driven gear 44. The fixed block 41 is arranged at an inner side wall of the sliding cover plate 30, the fixed block 41 has a screw hole along the moving direction of the sliding cover plate 30, the transmission shaft 42 has an external thread matching the screw hole, and the transmission shaft 42 passes through the screw hole on the fixed block 41 and is screwed with the fixed block 41. When the transmission shaft 42 rotates, the sliding cover plate 30 is driven through the fixed block 41 to move between the first position and the second position.

The driving gear 43 is arranged on a hinged shaft of the support 20 and the housing body 10 to rotate with the opening and closing of the support 20. The driven gear 44 is connected to one end of the transmission shaft 42, and the driving gear 43 and the driven gear 44 mesh with each other, so that the transmission shaft 42 is driven to rotate when the support 20 is opened or closed, thus driving the sliding cover plate 30 to open or close. In an exemplary embodiment, the driving gear 43 is an partial intermittent gear, so that the delayed opening of the sliding cover plate 30 can be realized, that is, when the support 20 is just opened, the sliding cover plate 30 does not move, and after a certain time the sliding cover plate 30 is opened with the opening of the support 20.

The present embodiment also provides a projector, which includes a housing, and an optical machine 50 and a fan 60 arranged inside the housing which is a projector housing of the above embodiments.

Figure 7:
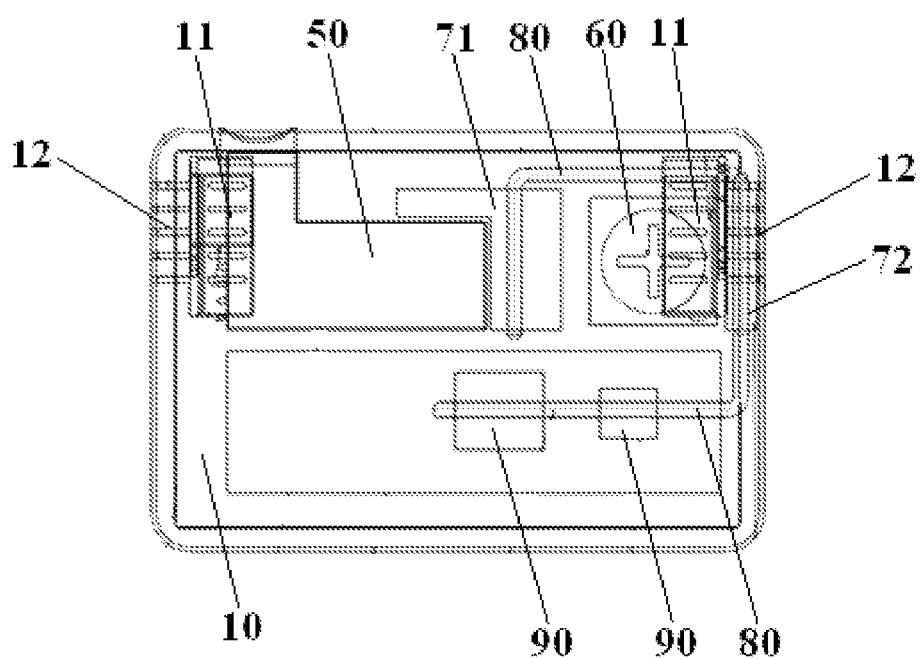
FIG. 7 is a schematic diagram of an alternative internal heat dissipation structure of a projector housing according to an embodiment of the present disclosure.

To achieve better heat dissipation of the projector, as shown in FIG. 7, a heat dissipation air passage is arranged in the housing body 10. Two opposite ends of the housing body 10 are provided with a first heat dissipation hole 11 and a second heat dissipation hole 12 respectively. The first heat dissipation hole 11 is located on a bottom wall of the housing body 10, and the second heat dissipation hole 12 is located on a side wall adjacent to the bottom wall. An air inlet of the heat dissipation air passage is communicated with each first heat dissipation hole 11 and the second heat dissipation hole 12 at one end of the housing body 10. An air outlet of the heat dissipation air passage is communicated with the second heat dissipation hole 12 at the other end of the housing body 10.

In an exemplary embodiment, there are two heat dissipation air passages. For one of the air passages, air is input from the first heat dissipation hole 11 and the second heat dissipation hole 12 at a first end of the housing body 10. That is, air is input from the first heat dissipation hole 11 and the second heat dissipation hole 12 at the left side in FIG. 7. Then the air passes through the inside of the housing body 10 and the fan 60, and is output by the second heat dissipation hole 12 at a second end of the housing body 10. That is, air is output from the second heat dissipation hole 12 at the right side in FIG. 7. For the other air passage, air is input from the first heat dissipation hole 11 at the second end of the housing body 10. That is, air is input from the first heat dissipation hole 11 at the right side in FIG. 7. The first heat dissipation hole 11 is opposite to the fan 60 in a vertical direction. After passing through the fan 60, air flow is also output from the second heat dissipation hole 12 at the second end of the housing body 10.

In the projector, heat generated by the optical machine 50 and a motherboard chip 90 is relatively large. For the optical machine 50, a DMD chip and a light source portion are regions where the heat generation is the largest. Therefore, in an exemplary embodiment, the DMD chip of the optical machine 50 is arranged at an inner side of the first heat dissipation hole 11 at the first end of the housing body 10, that is, the DMD chip is close to two air inlets namely the first heat dissipation hole 11 and the second heat dissipation hole 12 at the first end of the housing body 10, so that the DMD chip dissipates heat more quickly.

A first heat dissipation block 71 is further arranged in the air passage. A second heat dissipation block 72 is further arranged at the second heat dissipation hole 12 of the second end of the housing body 10. The first heat dissipation block 71 is in contact with the light source of the optical machine 50, and the first heat dissipation block 71 is connected to the second heat dissipation block 72 through a heat dissipation tube 80, so that the light source of the optical machine 50 dissipates heat better.

The motherboard chip 90 is connected to the second heat dissipation block 72 through the heat dissipation tube 80, and heat generated by the motherboard chip 90 is conducted to the second heat dissipation block 72, and is taken out of the air outlet under the action of air flow in the air passage.

The above embodiments are only alternative embodiments of the present disclosure, and are not intended to limit embodiments of the present disclosure. For those skilled in the art, various modifications and changes can be made to the embodiments of the present disclosure. Any modifications, equivalent replacements, improvements and the like made within the rule and scope of embodiments of the present disclosure are intended to be included within the scope of protection of the embodiments of the present disclosure.

INDUSTRIAL APPLICABILITY

According to the projector housing of the technical solution of an embodiment of the present disclosure, the support that is openable and closeable is arranged on the housing body, the first heat dissipation hole is provided at the inner side of the support, and when the support is closed on the housing body, the first heat dissipation hole is shielded, so that the heat dissipation requirement of a projector can be met, and the heat dissipation hole can be shielded when the projector is not used. Therefore, the attractiveness of the projector housing is improved, and the problem in the known art of influence on the attractiveness of a product due to a large number of holes on a projector for achieving heat dissipation is solved.

What is claimed is:

1. A projector housing, comprising a housing body and a support, wherein the support is arranged on the housing body in an openable or closable manner, the housing body is provided with a first heat dissipation hole which is arranged at an inner side of the support, and when closed on the housing body, the support shields the first heat dissipation hole;
   wherein the first heat dissipation hole is arranged on a bottom wall of the housing body, and the support comprises a support cover plate for shielding the first heat dissipation hole;
   wherein a second heat dissipation hole is arranged on a side wall of the housing body;
   wherein the support further comprises: a side frame;
   the side frame is connected to the support cover plate, the side frame is provided with a second dustproof net, and when the support is at a closed position, the second dustproof net shields one side of the second heat dissipation hole.

2. The projector housing according to claim 1, wherein two opposite side walls of the housing body are provided with the second heat dissipation hole, respectively.

3. The projector housing according to claim 1, wherein a lug portion is arranged on the side frame, and the support is hinged to the housing body through the lug portion.

4. The projector housing according to claim 1, wherein there are two supports, and inner sides of the two supports are provided with the first heat dissipation hole, respectively.

5. The projector housing according to claim 1, wherein a first dustproof net is arranged on an end surface of the first heat dissipation hole.

6. The projector housing according to claim 1, further comprising: a sliding cover plate, wherein
   the sliding cover plate is slidably arranged on the housing body, and the sliding cover plate shields a first position of the first heat dissipation hole and avoids a second position of the first heat dissipation hole.

7. The projector housing according to claim 6, wherein the support is in a transmission connection with the sliding cover plate, drives the sliding cover plate to be at the first position when the support is closed on the housing body, and drives the sliding cover plate to be at the second position when the support is opened from the housing body.

8. The projector housing according to claim 7, wherein the first heat dissipation hole is a strip-shaped hole, and the support and the sliding cover plate respectively shield a partial hole section of the first heat dissipation hole.

9. The projector housing according to claim 7, wherein the support is in the transmission connection with the sliding cover plate through a transmission component, and the transmission component comprises: a fixed block and a transmission shaft;
   the fixed block is arranged on the sliding cover plate; and
   the transmission shaft is in a threaded connection with the fixed block, the support is in a drive connection with the transmission shaft, and the support drives the transmission shaft to rotate.

10. The projector housing according to claim 9, wherein the support is provided with a driving gear, and the transmission shaft is provided with a driven gear that meshes with the driving gear.

11. The projector housing according to claim 1, wherein a heat dissipation air passage is provided in the housing body, two first heat dissipation holes and are provided respectively at two opposite ends of the bottom wall of the housing body, and two second heat dissipation holes are provided respectively at two opposite side walls of the housing body;
   an air inlet of the heat dissipation air passage is communicated with each of the two first heat dissipation holes and one of the two second heat dissipation holes at one side wall of the housing body, and an air outlet of the heat dissipation air passage is communicated with another of the two the second heat dissipation holes at the other end of the housing body.

12. A projector, comprising a housing, and an optical machine and a fan arranged inside the housing, the housing being the projector housing according to claim 1.

13. The projector according to claim 12, wherein two opposite ends of the housing body of the projector housing are provided with the first heat dissipation hole respectively, a Digital Micro-mirror Device, DMD, chip of the optical machine is arranged at an inner side of the first heat dissipation hole at one end of the housing body, and the fan is arranged at an inner side of the first heat dissipation hole at the other end of the housing body.

14. The projector according to claim 13, wherein two opposite side walls of the housing body are provided with a second heat dissipation hole respectively, the projector further comprising: a first heat dissipation block and a second heat dissipation block, wherein
   the first heat dissipation block is in contact with a light source of the optical machine; and
   the second heat dissipation block is arranged at the second heat dissipation hole on one side wall of the housing body, wherein the second heat dissipation block and the first heat dissipation block are connected through a heat dissipation tube.

15. The projector according to claim 14, further comprising: a motherboard chip, which is connected to the second heat dissipation block through the heat dissipation tube.

* * * * *